United States Patent [19]

Mead et al.

[11] 3,996,066
[45] Dec. 7, 1976

[54] LITHIUM-IODINE BATTERY

[75] Inventors: Ralph T. Mead, Kenmore; Norbert W. Frenz, North Tonawanda; Frank W. Rudolph, Depew, all of N.Y.

[73] Assignee: Eleanor & Wilson Greatbatch Foundation, Akron, N.Y.

[22] Filed: July 22, 1975

[21] Appl. No.: 597,975

[52] U.S. Cl. .................. 429/185; 29/623.2
[51] Int. Cl.² ...................... H01M 43/00
[58] Field of Search ........... 136/83 R, 20, 100 R, 136/166, 133, 169, 170, 6 F, 6 L, 6 LF, 6 R, 137; 128/419 P

[56] References Cited
UNITED STATES PATENTS

| | | | |
|---|---|---|---|
| 2,966,538 | 12/1960 | Bernot | 136/111 |
| 3,607,430 | 9/1971 | Glover | 136/111 |
| 3,674,562 | 7/1972 | Schneider et al. | 136/83 R |
| 3,723,183 | 3/1973 | Greatbatch | 136/83 R |
| 3,817,791 | 6/1974 | Greatbatch et al. | 136/83 R |
| 3,874,929 | 4/1975 | Greatbatch | 136/83 R |

*Primary Examiner*—Anthony Skapars
*Attorney, Agent, or Firm*—Christel & Bean

[57] ABSTRACT

A lithium-iodine cell comprising a pair of cup-shaped container elements each having a peripheral flange and each containing a lithium anode element and iodine-containing cathode material. The container elements are of material which is heat sealable and which does not exhibit electronic conduction when exposed to iodine. The container elements are juxtaposed with the cathode material of each container being in operative contact with a cathode current collector, and the peripheral flanges of the container elements are heat sealed together. The cell is encapsulated in potting material which is non-reactive with iodine, and the encapsulated cell is contained in an hermetically sealed metal casing having rounded surfaces.

18 Claims, 16 Drawing Figures

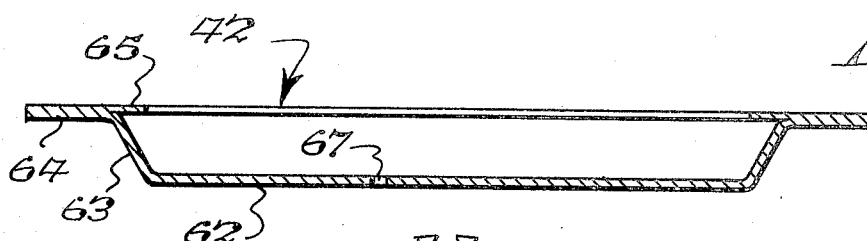
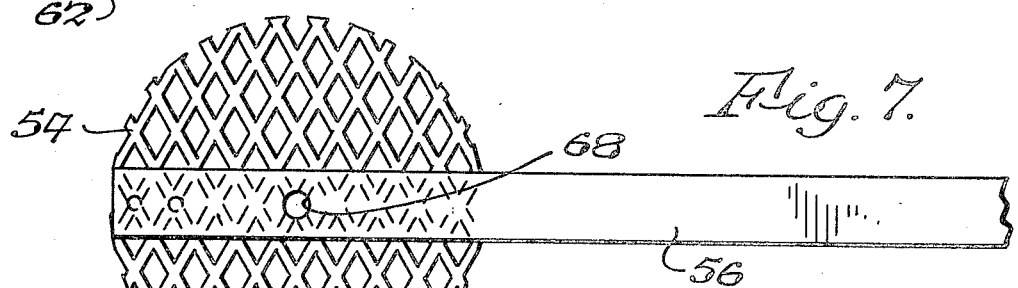
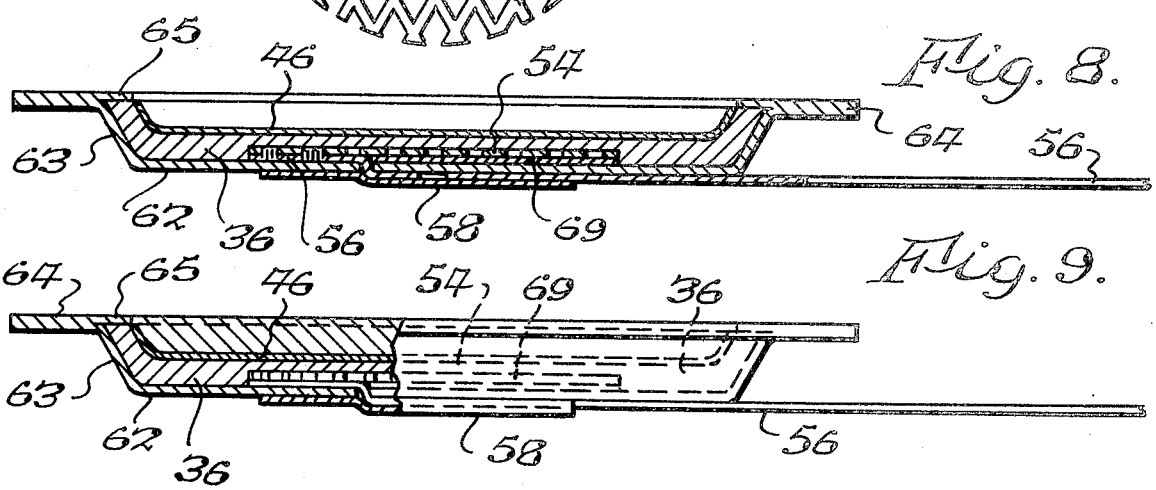
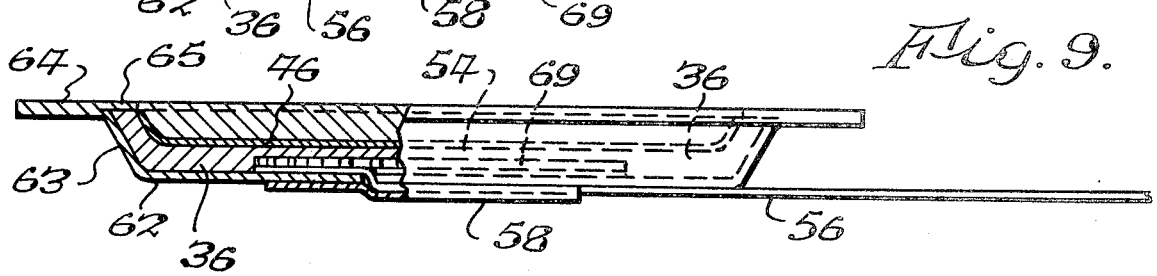
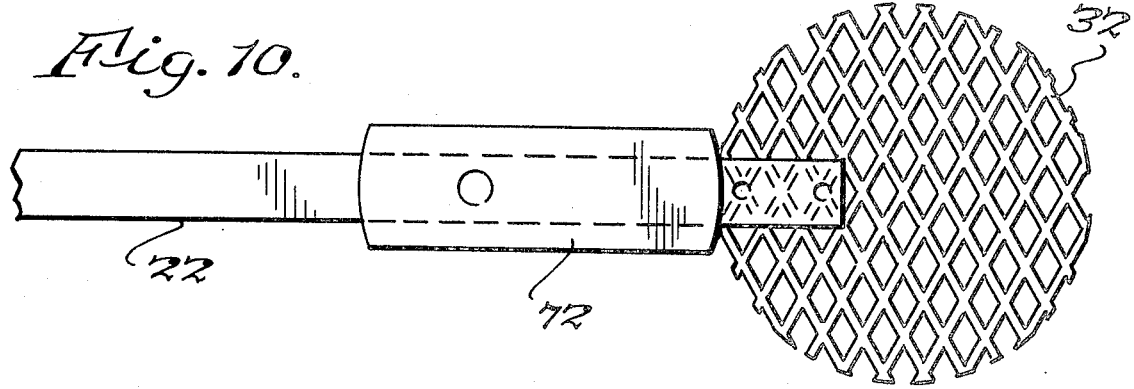
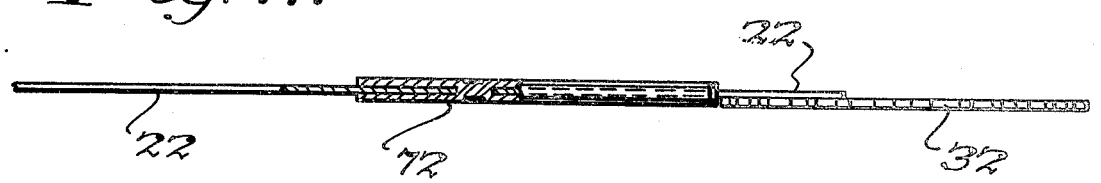

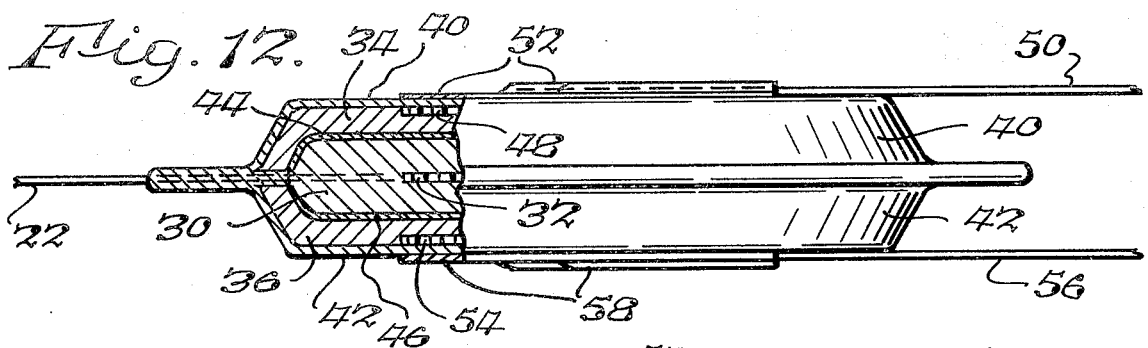
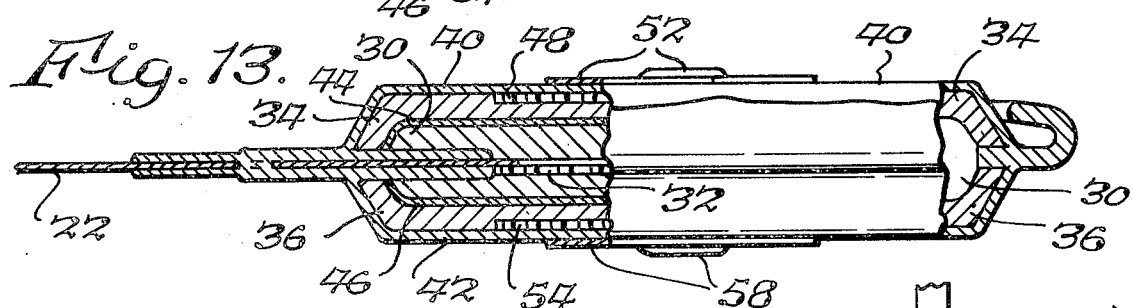
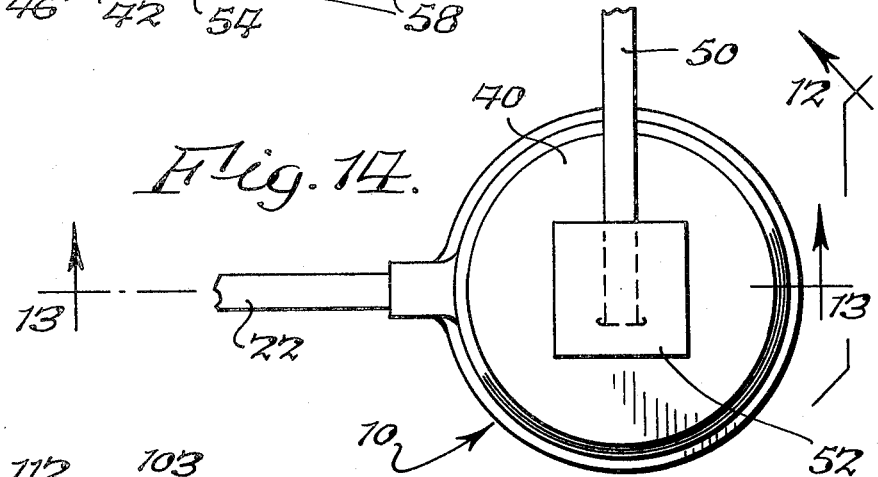
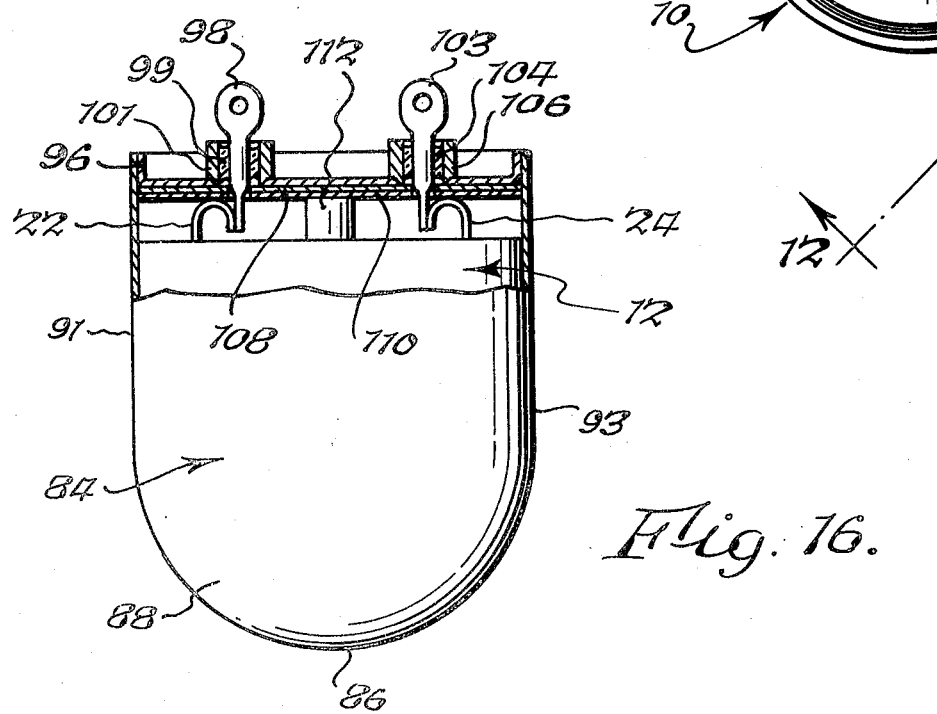

LITHIUM-IODINE BATTERY

BACKGROUND OF THE INVENTION

This invention relates to the conversion of chemical energy to electrical energy, and more particularly to a new and improved construction for lithium-iodine cells and method of making the same.

One area of use of the present invention is in providing electrical power safely to inaccessible devices in the human environment, for example to an implanted cardiac pacemaker, although the principles of the invention can be variously applied. Several types of batteries for implantable cardiac pacemakers have been proposed, and recently a lithium-iodine cell has been proposed which advantageously has an open circuit voltage about twice that of the mercury cell, does not generate gas during operation, and has a non-corrosive electrolyte.

A cell has been proposed including a lithium anode and a charge transfer complex of an organic donor component and iodine. In providing such a cell for human implantation, various considerations arise as to size and shape. In particular, such a cell must be relatively small in size to be suitable for implantation while at the same time having a lithium area of sufficient size to give the required level of current capability under load conditions. Furthermore, the cell should have an outer shape which causes little or no discomfort when implanted in the body. Along with these requirements, the cell should be constructed in a manner preventing an internal electrical short circuit arising from migration or flow of the iodine-containing cathode material. In addition, such a cell should be relatively easy and economical to manufacture.

SUMMARY OF THE INVENTION

It is, therefore, an object of this invention to provide a new and improved construction for a lithium-iodine cell and method of making the same.

It is a further object of this invention to provide a lithium-iodine cell having a relatively larger lithium area therein and a relatively small overall outer size.

It is a more particular object of this invention to provide such a lithium-iodine cell having an outer shape which causes little or no discomfort when implanted in a human body.

It is a further object of this invention to provide a lithium-iodine cell construction which confines migration or flow of the iodine material in a manner preventing internal electrical short circuits in the cell.

It is a further object of this invention to provide such a cell which can be manufactured relatively easily and economically.

The present invention provides a lithium iodine cell comprising first and second container elements each having a peripheral flange and juxtaposed in a manner defining a chamber and having the flanges adjacent, lithium anode means held in the chamber by the container elements, and cathode means comprising iodine-contacting material in the chamber and operatively contacting the lithium anode means. The anode means preferably comprises a lithium element in each container to provide a lithium area of sufficient size for an adequate level of current capability under load conditions. The peripheral flanges are heat sealed together and in a manner preventing flow of the iodine containing cathode material, and the cell is encapsulated in potting material which is non-reactive with iodine. The encapsulated cell is contained in an hermetically sealed outer casing having curved surfaces.

The foregoing and additional advantages and characterizing features of the present invention will become apparent upon a reading of the ensuing detailed description together with the included drawing wherein:

BRIEF DESCRIPTION OF THE DRAWING FIGURES

FIG. 6 is a sectional view of an anode holder or cup element for the cell of the present invention;

FIG. 7 is a plan view of an anode current collector and lead subassembly of the cell of the present invention;

FIG. 8 is a sectional view of an anode subassembly of the cell of the present invention;

FIG. 9 is an elevational view, partly in section, showing one half of a partially completed cell according to the present invention;

FIG. 10 is a plan view of a cathode current collector and lead subassembly;

FIG. 11 is an elevational view of the current collector and lead of FIG. 10;

FIG. 12 is an elevational view, partly in section, of a completed cell according to the present invention taken about on line 12—12 in FIG. 14;

FIG. 13 is an elevational view, partly in section, of a completed cell according to the present invention taken about on line 13—13 in FIG. 14;

FIG. 14 is a plan view of a completed cell according to the present invention;

FIG. 16 is a fragmentary sectional view of an enclosed cell according to the present invention.

DETAILED DESCRIPTION OF THE ILLUSTRATED EMBODIMENT

Figure 1:
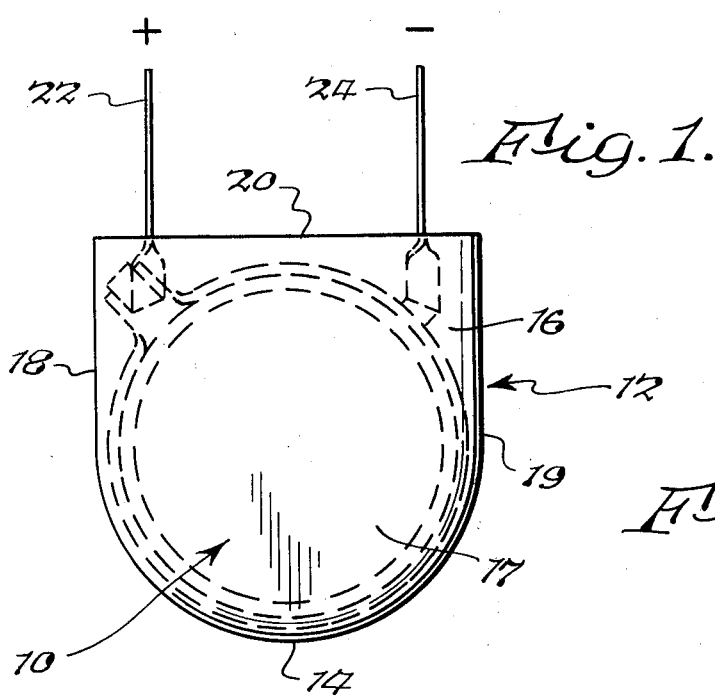
FIG. 1 is a side elevational view of a lithium-iodine cell encapsulated in potting material according to the present invention.

A lithium-iodine cell according to the present invention, generally designated 10, is shown in FIGS. 1–5 within a housing or container in the form of a body 12, the cell 10 being encapsulated therein by potting material. The housing 12 is of a shape having a curved or arcuate bottom surface portion 14 as view in FIG. 1, first and second planar side wall portions 16 and 17, respectively, first and second generally curved or arcuate end surface portions 18 and 19, respectively, and a generally planar top surface portion 20 disposed at about a right angle with respect to each of the planar side wall portions 16, 17. The surface 14 is curved in two directions or dimensions, i.e. the curvature in the plane parallel to the sidewalls 16, 17 and the curvature in the plane perpendicular to sidewalls 16, 17 which curvature is a continuation of the curvature of end surfaces 18, 19. For convenience, all the curved edges or surfaces of body 12 can be semicircular. Cell 10 has a cathode lead 22 and an anode lead 24 extending outwardly of housing 12 enabling external electrical connection to be made to cell 10. The manner in which cell 10 is encapsulated in potting material to provide the housing or body 12 will be described in detail presently.

Referring now to FIGS. 12–14, the lithium-iodine cell according to the present invention comprises cathode means comprising a charge transfer complex of an organic donor component material and iodine. A preferred method of making material 30 and combining it with the other elements of the cell will be described in detail further on in the specification. The cathode material 30 is of a shape having at least two surface portions, in particular the spaced-apart upper and lower oppositely-directed surface portions as viewed in FIGS. 12 and 13. A current collector element 32 is located in the cathode material 30 spaced from the surface portions, in particular being disposed substantially parallel to and equidistant from the upper and lower surface portions. Cathode lead 22 is bonded or welded at one end to cathode current collector 32 and extends from the material 30 and through the remaining components of the cell in a manner to be described so as to be externally available for making an electrical connection thereto.

The cell of the present invention further comprises a first lithium anode element 34 operatively contacting one of the surface portions of cathode material 30, in the present illustration the upper surface thereof as viewed in FIGS. 12 and 13, and a second lithium anode element 36 operatively contacting the other surface portion of cathode material 30, i.e. the lower portion thereof as viewed in FIGS. 12 and 13. Each of the lithium anode elements 34, 36 has a generally cup-like shape including a generally planar base portion and a circumferential rim portion extending therefrom. In the present illustration, the elements 34, 36 have generally diskshaped base portions and annular rim portions which extend from the base portion at an acute angle with respect thereto. Each lithium anode element 34, 36 has oppositely-directed surfaces and one of the opposite surfaces of each of the elements operatively contacts the cathode material 30. A first anode container or holder 40 embraces the lithium anode element 34 in a manner exposing the one surface of the lithium element to the cathode material 30 and contacting the other surface of the lithium anode element. Holder 40 is generally cup-shaped having a disk-shaped and generally planar base portion, an annular rim portion extending from the base portion and disposed at an acute angle relative thereto, and a circumferential flange having both inwardly and outwardly radially extending portions. Lithium anode element 34 is formed into holder 40 in a manner conforming generally to the inner shape thereof with the marginal or peripheral edge of element 40 abutting or contacting the inwardly extending portion of the circumferential flange, and the manner whereby lithium element 34 and holder 40 are formed will be described in detail presently. The edge of lithium element 40 contacts the inwardly extending flange in a manner sealing against any flow of the iodine-containing cathode material 30 between the lithium element and flange, thereby preventing any internal short circuit arising from contact between the cathode material and the anode current collector. Similarly, a second anode holder or container 42 embraces lithium anode element 36 in a manner exposing the one surface of lithium element 36 to the cathode material 30 and contacting the other surface thereof. Holder 42 also is generally cup-shaped having a disk-shaped and generally planar base portion, an annular rim portion extending therefrom at an acute angle, and a circumferential flange having both inwardly and outwardly radially extending portions. Lithium anode element 36 is formed in holder 42 in a manner conforming generally to the inner shape thereof, and the marginal or peripheral edge of element 36 contacts or abuts the inwardly extending flange portion to seal against flow of cathode material in the same manner as described above.

The cell is assembled in a manner such that the circumferential flange portions of the holders 40, 42 are juxtaposed and sealed together in a manner which will be described presently. The anode holders or containers 40, 42 are both of a material which does not exhibit electronic conduction when exposed to iodine. One material found to satisfy this requirement is a fluoropolymer material available commercially from the Allied Chemical Company under the trademark Halar. In addition, each of the lithium anode elements 34 and 36 have a coating 44 and 46 respectively on the surfaces thereof operatively associated with cathode material 30. The coatings 44, 46 are of an organic electron donor component material, for example polyvinyl pyridine. A preferred method of forming the lithium anode elements into the corresponding holders and providing the coatings thereon will be described in detail presently.

The cell of the present invention further comprises anode electrical conductor means operatively connected to the lithium anode elements 34 and 36. In particular, a first anode current collector element 48 is positioned between lithium element 34 and the inner surface of the base portion of holder 40 as shown in FIGS. 12 and 13, being in firm contact with the lithium element. A small disk of anode material may be placed between collector element 48 and holder 40 in a manner which will be described further on in the specification. An anode lead 50 is joined at one end such as by welding to current collector 48 and extends therefrom through a slot or opening provided in the base portion of holder 40 and lies along the outer surface of holder 40 as shown in FIG. 12. A seal or patch 52 is placed over the outer surface of holder 40 around the slot or opening and over the corresponding portion of lead 50, being secured thereto by a suitable cement. Seal element 52 is of a material which is non-reactive with iodine, preferably a fluoropolymer material commercially available from the Dupont Company under the trademark Tefzel, and a preferred form of cement is a fast-setting type which prevents migration of iodine therethrough such as the cyanoacrylate cement commercially available from Techni-Tool, Inc. under the designation Perma-Bond 101. Similarly, a current collector 54 is positioned between element 36 and the inner surface of holder 42, being in firm contact with the lithium element. A small disc of anode material may be placed between current collector 54 and holder 42 in a manner which will be described further on in the specification. One end of an anode lead 56 is joined such as by welding to current collector 54, and lead 56 extends through a slot or opening provided in the base portion of holder 48 and extends along the outer surface of holder 42 as shown in FIG. 12. A sealing element 58 is positioned over the opening and the adjacent portion of holder 42 and lead 56, and seal or patch 58 preferably also is of Tefzel material and secured in place by the same type of cyanoacrylate cement. Leads 50 and 56 are joined together along the portions extending away from the assembly to form the single anode lead 24 shown in FIGS. 1–4. Anode current collectors 48, 54 preferably are of No. 12 mesh zirconium metal, and anode leads 50, 56 are thin strips of zirconium metal.

The lithium-iodine cell of the present invention is formed and assembled in the following manner. The anode assemblies are formed first, and turning now to FIG. 6 there is shown one of the anode cup or holder elements, in particular element 42, it being understood that anode cup or holder 40 is identical to the one shown in FIG. 6. Holder 42 has a central or base portion 62 which is generally planar, a outwardly extending rim portion 63 disposed at an acute angle to the plane of the base portion, and a peripheral or circumferential flange having a portion 64 which extends radially outwardly of rim 63 and a portion 65 which extends radially inwardly of rim 63. Flange portion 64 has a thickness greater than that of flange portion 65, and one way of forming cup 42 is to provide or form cup having a shape like that shown in FIG. 6 with base 62, rim 63 and the outwardly extending flange all of the same or uniform thickness but without flange portion 65 and then sealing a disk to the cup by heat or otherwise, the disk having an outer diameter equal to the outer diameter of flange portion 64, a thickness substantially equal to the desired thickness of flange portion 65 and being of the same material as that of the rest of cup 42, i.e. the aforementioned Halar material. Then the center of the disk is cut out to result in the desired radial dimension of portion 65. Alternatively, an annular ring can be provided having an outer diameter equal to the outer diameter of flange portion 64, a thickness substantially equal to the desired thickness of flange portion 65, and an inner diameter of a size providing the desired radial dimension of portion 65. The cup and ring are then pressed together and subjected to heat in a known manner to provide a fused or molded assembly. The annular ring would be of the same material as that of the remaining portion of cup 42, in particular the aforementioned Halar material. By way of illustration, typical dimensions for cup 42 in a relatively small size cell, for example one to be used in a pediatric pacemaker, include base portion 62 having a diameter of about 1.055 inches, an overall diameter of about 1.40 inches coinciding with the outer diameter of flange 64, a thickness for base 62, rim 63 and flange portions 65 of about 0.010 inch, a thickness of about 0.020 inch for flange portion 65, and an angle of about 60° defined between rim 63 and the plane of base 62. The distance measured from the outer surface or base 62 to the surface of flange 64 adjacent rim 63 is about 0.115 inch. Base 62 is provided with a slit or opening 67 to accommodate the anode lead in a manner which now will be described. Each holder 40, 42 thus can be viewed as a container having a solid body portion, i.e. the base and rim portions, defining an interior region therein and an opening communicating with the interior region, i.e. the open side around which the peripheral flange extends.

Referring to FIG. 7, anode lead 56 is welded or otherwise bonded at one end to current collector 54, lead 56 being provided with an alignment or centering aperture 68 to facilitate the assembly operation. By way of illustration, collector 54 is of No. 12 zirconium mesh having a thickness of 0.004 inch and lead 56 is a thin strip of zirconium. Collector 48 and anode lead 50 are of identical construction. The other or free end of anode lead 56 is drawn through slit 67 in the base 62 of holder 44 in a manner drawing current collector 54 toward and against the inner surface of base 62. A thin, disk-shaped lithium element 69 is placed between collector 54 and the surface of base 62 as holder 44 is drawn tightly toward base 62. The button-like element has a thickness, for example, of about 0.015 inch and is of a size and is located so that one edge portion abuts lead 56 and the opposite edge portion coincides with an edge portion of collector 54 as shown in FIG. 8. Collector 48 and lead 50 are installed in cup 40 in an identical manner, which includes positioning a thin button-like lithium element similar to button 69 between collector 48 and the base surface of cup 50. Then a lithium element, in the present instance a generally disk-shaped element, is placed in holder 42 against collector 54 and the inner surface of base 62 whereupon the combination is placed in a mold or other suitable holding fixture and then pressure is applied by suitable means to the exposed face of the lithium element in a manner forming or extruding it along the inner surface or rim portion 63 until the peripheral edge of the lithium element contacts or abuts the inner surface of flange portion 65 to form the lithium element 36 conforming to the shape of cup 42 as shown in FIG. 8. The shape is of course determined by the original dimensions of the lithium element and in the amount of pressure applied. The material of holder 42 should be pressure bondable to lithium, this being a characteristic of the aforementioned Halar material, and by virtue of the pressure forming operation, the inner surface of the lithium element is bonded or sealed to the inner surface of holder 42 in a manner sealing current collector 54 therein and protecting it against migration of any of the iodine-containing material. The seal between the lithium element and the inner flange prevents migration or flow of cathode material between the inner surface of the anode holder and the back surface of the lithium element where anode current collector is located. The pressure forming operation also causes a bonding of lithium button 69 to the adjacent surface of base 42 in a manner sealing the region adjacent opening 67. It also causes button 69, in conjunction with lithium element 36, to embed the corresponding region of collector 54. This, in turn, overcomes or minimizes any tendency of lithium element 36 to separate from collector 54 during the life of the cell. In a similar manner a disk shaped lithium element is placed in holder 40 against current collctor 48 and the inner surface of the base portion thereof whereupon holder 40 containing the lithium element is placed within a mold or suitable holding fixture and pressure applied to the outer face of the lithium element. The element also is formed to conform to the shape of holder 40 as shown in FIGS. 12 and 13, the inner surface of the lithium element being bonded or sealed to the inner surface of holder 40 in a manner sealing current collector 48 therein and protecting against migration of any of the iodine-containing material. The lithium button seals the opening in the base of holder 40 and embeds the current collector in a manner similar to button 69 of the foregoing assembly. The seals or patches 52, 58 are secured to the outer surfaces of holders 40, 42 in a manner as previously described.

As shown in FIGS. 10 and 11, cathode lead 22 is secured at one end such as by welding to cathode current collector 32. Collector 32 is preferably of No. 12 mesh platinum metal and lead 22 preferably is a thin strip of platinum iridium alloy. An insulator 72 can be formed by providing two planar elements of insulating material, for example the aforementioned Halar material, and then applying sufficient heat and pressure to form the completed structure with a portion of lead 22 embedded or encapsulated in the insulating material 72. Lead 22 can have one or a number of openings therethrough to facilitate adherance of the material 72. The location of material 72 is such that one end thereof contacts collector 32 and the other end terminates to leave exposed a portion of lead 22.

The surfaces of the lithium anode elements 34 and 36 adapted to be operatively associated with the cathode in the battery are provided with coatings 44 and 46, respectively, of an organic donor component material. In particular, the material in each coating is an organic electron donor material of the group of organic compounds known as charge transfer complex donors. The material of the coatings can be the organic donor used in preparing the charge transfer complex of the cathode material, but other materials can be employed. A preferred material for each coating is polyvinyl pyridine and it is applied to the exposed surface of each lithium element 34 and 36 in the following manner. A solution of two-vinyl pyridine polymer in anhydrous benzene or other suitable solvent is prepared. The two-vinyl pyridine is readily commercially available. The solution is prepared with two-vinyl pyridine present in the range from about 10% to about 20% by weight with a strength of about 14% by weight of two-vinyl pyridine being preferred. While two-vinyl pyridine, four-vinyl pyridine and three-ethyl two-vinyl pyridine can be used, two-vinyl pyridine is preferred because of its more fluid characteristics. When the solution is prepared at a strength below about 10% the resulting coating can be undesirably too thin, and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coating anode then is exposed to a desiccant in a manner sufficient to remove the benzene from the coating. In particular, the coated anode is placed in a chamber with barium oxide solid material for a time sufficient to remove the benzene, which can be in the neighborhood of 24 hours.

Cathode material 30 comprises a charge transfer complex of an organic material and iodine. The organic material should be an electron donor and can be any organic compound having a double bond or an amine group. An electron donor gives the iodine sufficient conductivity for proper cell operation. A preferred organic material is two-vinyl pyridine polymer. The cathode material 30 is prepared by heating the organic material, i.e. two-vinyl pyridine, mixed with iodine, to a temperature greater than the crystallization temperature of iodine. The amount of iodine should be greater than about 50% by weight of the resulting mixture so that enough iodine is available in the cathode material 30 to provide sufficient conductivity for proper cell operation.

The resulting mixture is a viscous, flowable substance which is combined with the anodes to form the cell in the following manner. A subassembly comprising anode holder 42, lithium element 36, current collector 54 and lead 56 is supported or otherwise held in an upright position similar to that shown in FIG. 8 whereupon the material 30 is poured therein up to a level flush with the upper surface of the peripheral flange. Similarly, the other subassembly comprising anode holder 40, lithium element 34, collector 48 and lead 50 is supported or held in the same manner and material 30 is poured therein up to a level flush with the upper surface of the peripheral flange. The combination of cathode current collector 32, lead 22 and insulator 72 then is placed on one of the subassemblies, for example the one of holder 42, in a manner such that current collector 32 contacts the exposed surface of the cathode material, insulator 72 rests on the upper surface of the peripheral flange, and lead 22 extends outwardly therefrom. The cathode material of both sub-assemblies is allowed to cool to a non-flowable or substantially solid condition for ease in handling. Then one of the sub-assemblies, i.e. the one including anode holder 40, is moved into position with the peripheral flange thereof contacting the peripheral flange of the other subassembly and with the two confining therebetween the cathode material 30.

Figure 15:
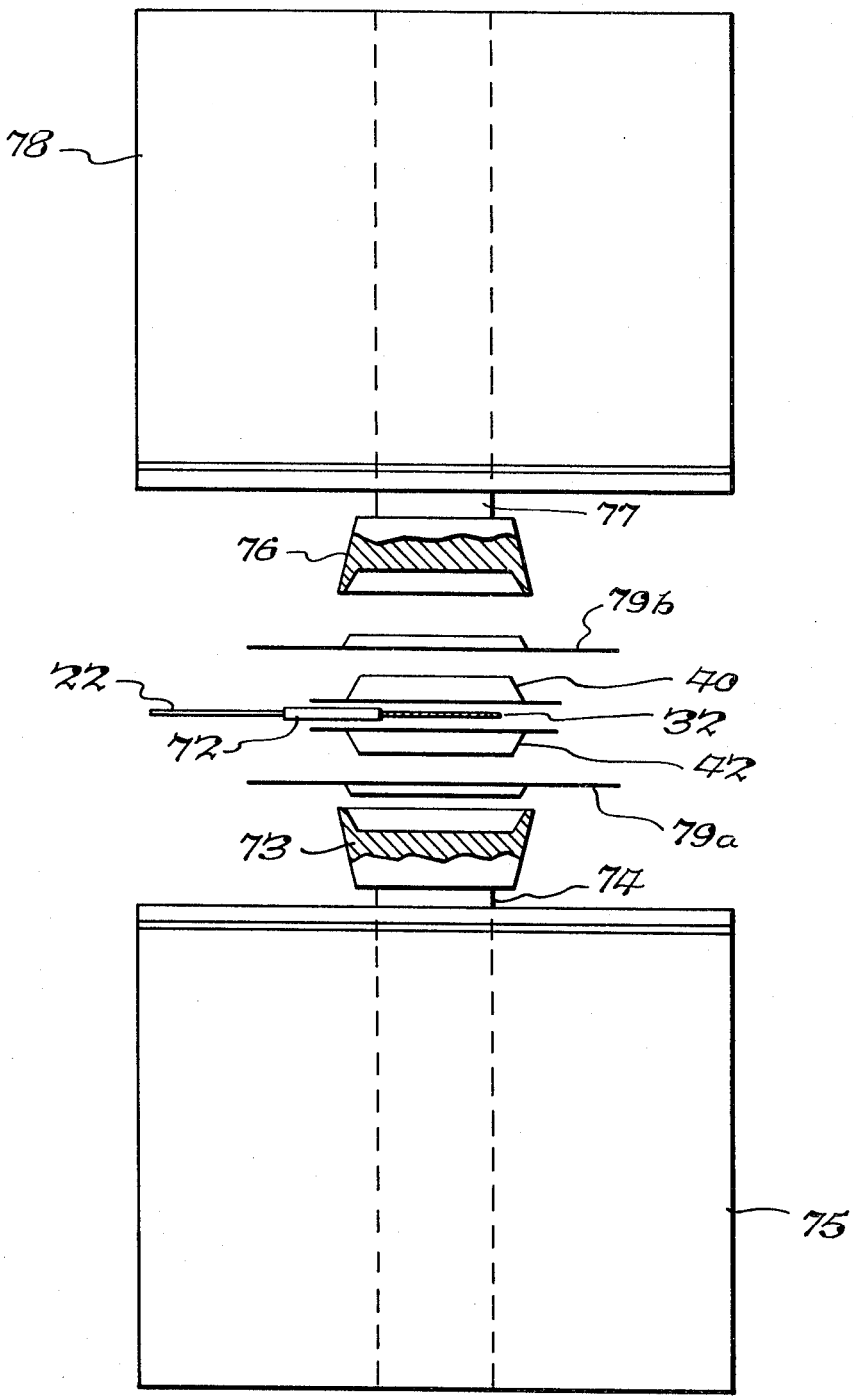
FIG. 15 is a diagrammatic view illustrating a method according to the present invention.

In accordance with the present invention, the resulting assembly is subjected to pressure and heat applied to the peripheral flanges in a manner heat sealing them together. The peripheral flanges of the anode holders 40, 42 therefore must be of a material which is heat sealable, and this requirement is satisfied by the aforementioned Halar material. In particular, and referring to FIG. 15, a preferred arrangement for heat sealing the subassemblies together includes a first holding fixture or cup 73 supported on one end, i.e. the upper end, of a vertically disposed tube or conduit 74. Conduit 74, in addition to supporting cup 73, can transmit low temperature fluid to cup 73 in a manner refrigerating the cup 73 for a purpose to be described. A heating device 75 in the form of a moveable, ring shaped heated platen is movably positioned in co-axial relationship with conduit 74. For convenience in illustration, cup 73 and heater 75 are designated the bottom cup and heater as viewed in FIG. 15. The arrangement further comprises a second holding fixture or cup 76 supported on one end, i.e. the lower end as viewed in FIG. 15, of a vertically disposed tube or conduit 77. Conduit 77, in addition to supporting cup 76, can transmit low temperature fluid to cup 76 in a manner refigerating the cup for a purpose to be described. A heating device 78 in the form of a movable, ring-shaped heated platen is movably positioned in coaxial relationship with conduit 77. Cup 76 and heater 78 are positioned is spaced-apart, axial alignment with cup 73 and heater 75, and for convenience in illustration, cup 76 and heater 78 are designated the upper cup and heater as viewed in FIG. 15.

A pair of cell subassemblies are placed together against the cathode assembly including collector 32 with cathode lead 22 positioned about ninety degrees away from the anode leads of the half-cell subassemblies. Thus, the containers 40, 42 are juxtaposed to define an assembly with the peripheral flanges of the containers being in contact and the interior regions of the containers defining a single closed chamber containing the lithium anode elements and the cathode material. The half-cells are pressed firmly together by hand in a manner such that they are properly aligned, in particular such that the cup-shaped portions of the holders 40, 42 are properly aligned. A parting sheet 79a is placed on the cooling cup 73 and the combination of the subassemblies is placed on sheet 79a with the base portion of holder 42 contacting sheet 79a and with the downwardly facing cup-shaped body portion of holder 42 in alignment with the upwardly facing cup-shaped recess or interior of the holding fixture 73. Another parting sheet 79b is placed over the combination in contact with the base portion of holder 40. Parting sheets 79a, 79b serve to prevent the material of the subassemblies from adhering to the heated platens, and one material found to provide satisfactory results is a polyimide film material available from the Dupont Company under the registered trademark Capton. Each sheet 79a, 79b has preferably a thickness of about 0.003 inch. One or both of the arrangements of cup 73 fixed to conduit 74 and cup 76 fixed to conduit 77 are mounted for relative axial movement, and by virtue of this arrangement cups 73, 76 are moved toward each other in a manner firmly clamping or otherwise holding the combination of the cell subassemblies therebetween. The cup-shaped body portion of cell component 42 fits into the cup-shaped interior recess of holder 73 with parting sheet 79a therebetween, and the cup-shaped body portion of cell component 40 fits into the cup-shaped interior recess of holder 76 with parting sheet 79b therebetween. Cups 73, 76 are refrigerated and preferably at a temperature of about $20° F \pm 5° F$. Heaters 75, 78 are placed in operation and the ring-shaped platens thereof are moved into contact with the opposite surfaces of the peripheral flanges of the combination of cell subassemblies in a manner applying heat and pressure to the flanges. Heat is applied at a temperature of $495° F \pm 5° F$ and pressure is applied at a force of 60 pounds $\pm$ 10 pounds. The application of heat and pressure is done for about 1.5 minutes and in a manner heat sealing the composite peripheral flange of the two cell subassemblies to a thickness preferably of 0.015 inch + 0.003 inch/ − 0.002 inch, the thickness being controlled by controlling the relative movement of the heated platens by suitable mechanical stops. The refrigerated cups 73, 76 prevent melting and flowing of the cathode material during the heat sealing operation. The heated platens then are moved out of contact with the cell combination to allow the heat sealed flange to cool, and cups 73, 76 continue to clamp or grasp the cell combination during cooling. Thereafter, cups 73, 76 are moved to release the cell combination and the parting sheets 79a, 79b are removed. The resulting assembly is similar to that shown in FIG. 12.

The heat sealed peripheral flange is trimmed to the desired overall diameter. By way of illustration, for a relatively small size cell, for example one to be used in a pediatric pacemaker, the overall diameter measured with respect to the peripheral flange is about 1⅜ inches. Next, the peripheral flange is shaped or formed to a generally U-shaped configuration as shown in FIG. 13. This is done by rolling over or bending the heat sealed flange with a tool such as a bar heated to a temperature of $285° F \pm 15° F$. The shaping or rolling is done on the flange around the entire circumferential or peripheral length thereof. The overall cell diameter thus is reduced, typically to a diameter of about 1.255 inches. The rolling operation enables the cell assembly to have a good bond or seal along the entire peripheral flange while at the same having a relatively small overall diameter. The rolling operation avoids the need to cut or trim the heat sealed peripheral flange any further thereby avoiding the risk of cutting into a portion of the flange which is not heat sealed. The resulting sealed flange thus is shaped to include a portion extending outwardly from the assembly and another portion which is curved and extends inwardly toward the assembly. The resulting assembly is similar to that shown in FIG. 13 and the anode leads 50, 56 can be brought around together and joined to provide the single or composite anode lead 24, or leads 50, 56 can be trimmed and welded or otherwise bonded to ends of a separate composite anode lead.

The lithium-iodine cell according to the present invention operates in the following manner. As soon as the iodine-containing cathode material 30 operatively contacts the lithium elements 34, 36, a lithium-iodine electrolyte begins to form at each interface between material 30 and elements 34, 36 and an electrical potential difference exists between cathode lead 22 and the composite anode lead 24.

The coatings 44 and 46 on lithium elements 34, and 42 respectively, perform several important functions. One is a desirable reduction in cell impedance believed to result from a better and improved electrically effective contact area between the cathode material and each lithium anode element. In particular, when iodine-contaning cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 44 and 46 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode lithium element by the cathode material. In addition, the protective coatings 44, 46 permit a relatively longer handling time during construction of the cell prior to introducing the hot cathode material.

Figure 2:
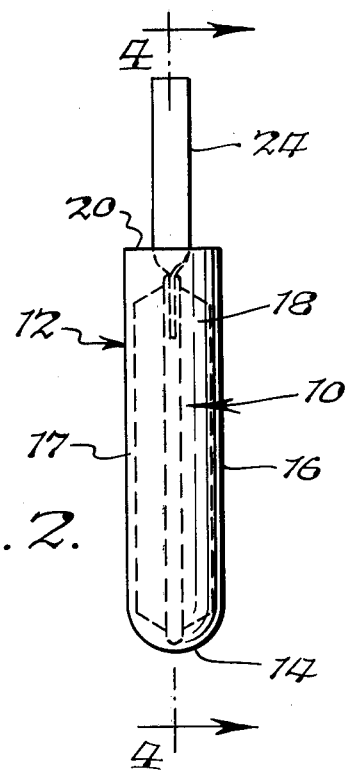
FIG. 2 is an end elevational view of the cell of FIG. 1.
Figure 3:
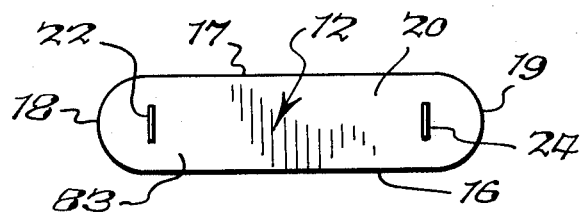
FIG. 3 is a top plan view of the cell of FIG. 1.
Figure 4:
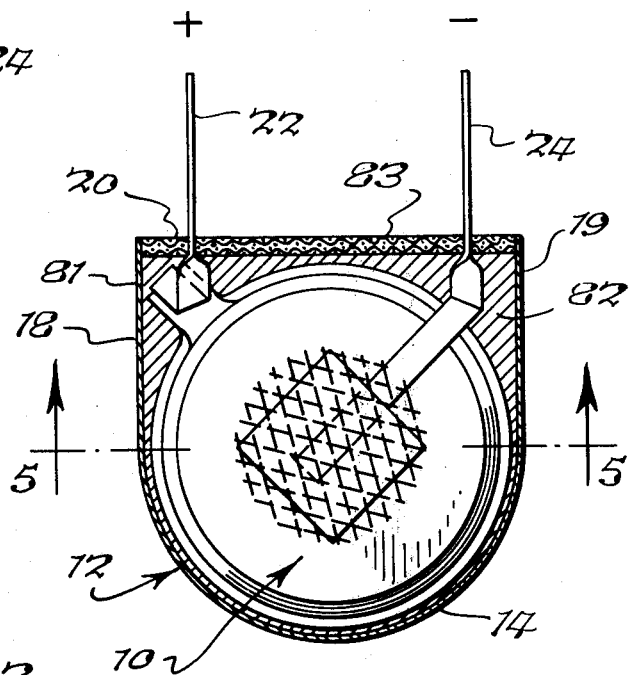
FIG. 4 is a sectional view taken about on line 4—4 in FIG. 2.
Figure 5:
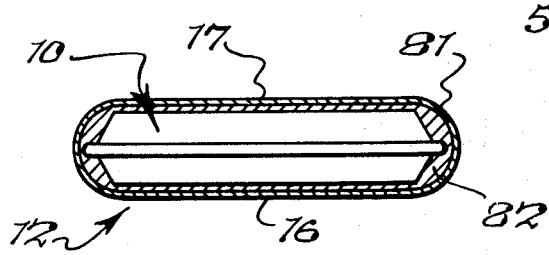
FIG. 5 is a sectional view taken about on line 5—5 in FIG. 4.

The cell of the present invention is encapsulated in potting material in the following manner. There is provided a potting container or bag-like housing 81 shown in FIGS. 4 and 5 of a material which does not exhibit electronic conduction when exposed to iodine, for example a fluoropolymer material commercially available from the Dupont Company under the trademark Tefzel. Container 81 has a shape which provides or defines the surfaces of body 12 previously described in conjunction with FIGS. 1–3. In particular, container 81 has a curved or arcuate bottom portion as viewed in FIG. 4, spaced-apart generally parallel and planar sidewall portions as shown in FIG. 5, and generally curved or arcuate end walls portions joining the sidewall portions. The bottom portion of container 81 is curved in two directions or dimensions, i.e. the curvature in the plane parallel to the sidewalls and the curvature in the plane perpendicular to the sidewalls which curvature is a continuation of the curvature of the end surfaces. The container 81 is open at the end opposite the curved bottom portion. By way of illustration, typical dimensions for container 81 in a relatively small-sized cell, for example, one to be used in a pediatric pacemaker, include an overall length for container 81 of about 1.325 inches, a distance between outer surfaces of the end wall portions of about 1.260 inches, a distance between outer surfaces of the end wall portions of about 0.30 inch, and a wall thickness of about 0.0050 inch. The bottom portion as viewed in FIG. 4 is a semi circle having a radius of about 0.63 inch, and each end wall portion has a radius of about 0.150 inch. Then potting material is introduced to container 81, the potting material being of a type which does not exhibit electronic conduction when exposed to iodine, for example a suitable polyester material commercial available from the Durez Division of the Hooker Chemical Company under the designation Hetron 32 A. A completed cell such as that shown in FIGS. 12–14 is inserted into the housing 81 containing potting material 82, and a strip of fiberglass material 83 having appropriately located openings to receive the leads 22, 24 is fitted in the open end of container 81. Strip 83 serves as an insulator and is secured therein upon curing the polyester material 82, this generally being done at room temperature. The encapsulated cell in completed form is shown in FIGS. 1–3.

The cell enclosure of the present invention is completed by a hollow casing 84 shown in FIG. 16 which encloses the encapsulated casing 12. Casing 84 is hollow, of a size sufficient to contain the encapsulated casing 12 in a snug-fitting manner, and is of metal such as stainless steel. Casing 84 is drawn or otherwise formed to be of integral construction including a bottom portion 86 which is curved in both the plane of the drawing and a plane perpendicular thereto, spaced-apart generally planar side walls such as, 88 and curved or semi-circular end walls 91, 93 joining the side walls. Thus, casing 84 has a shape similar to that of the potted enclosure 12.

Casing 84 is sealed or closed by a lid header assembly in the following manner. A lid header member 96 of metal has a first terminal element 98 fitted in a bushing 99 which is sealed in a ferrule 101 which, in turn, is secured such as by welding to header 96 over an opening provided therein. Similarly, a second terminal element 103 is fixed in a bushing 104 which is sealed in a ferrule 106, which, in turn, is secured to header 96 over a second opening provided therein. A thermal insulating member or strip 108 of fiberglass or similar material and an electrical insulating member or strip 108 of fiberglass or similar material and an electrical insulating member or strip 110 of Teflon or similar material are located against the lower surface of header 96 and have openings to receive the lower ends of terminals 98, 103. Leads 22, 24 are welded or otherwise bonded to the lower ends of terminals 98, 103, respectively, and then the assembly is fitted into the open end of casing 84 so that strips 108, 110 rest on or are supported by a protuberance or spacer element 112 fixed to the upper surface of enclosure 12. The lid header 96 thus fits in the opening of casing 84 and is welded therein to form a hermetically sealed enclosure. The hermetic seal confines any gas generated by the cell within the enclosure and it keeps any external moisture from entering the cell. By virtue of this arrangement, the header member 96 and insulator strips 108, 110 are supported on the protuberance 112, so as to be spaced from the neighboring end of the potted enclosure 12. The region or space therebetween not only provides room for leads 22, 24 and connection thereof to terminals 98, 103 but also provides a space to accommodate any leakage of the iodine-containing cathode material should that occur, thereby preventing any leaking material from contacting header element 96. The strip of fiberglass material 108 provides thermal insulation for the electrical insulator 110 from heat developed by and around the header 96.

The lithium-iodine cell according the the present invention is relatively small in size to be suitable for implantation while at the same time having a lithium area of sufficient size to provide an adequate level of current capability under load conditions. The provision of cup-shaped anode holders or containers 40 and 42 with lithium elements 34 and 36, respectively, shaped to conform to the interior surfaces of the holders provides a large anode area of lithium in operative contact with the cathode material. The cup-shaped containers 40, 42 which house the lithium anode means and the cathode means comprising iodine-containing material of the cell and which containers are heat sealed together enable the overall size of the cell to be made relatively small. The rounded or curved surfaces of the cell outer casing provide a relatively more comfortable fit in the body of a patient when the cell is used for providing electrical power to an implanted artificial cardiac pacemaker. Providing the cup shaped holders 40, 42 each having generally planar base portions and outwardly extending rim portions disposed at an acute angle to the base portion and being heat sealed together along the peripheral flanges results in a maximum utilization of space in the outer casing which has curved or rounded edges. Heat sealing the cell subassemblies together according to the present invention provides an effective seal in a relatively small amount of production time thereby resulting in economies of manufacture. The arrangement wherein lithium elements 34 and 36 are formed into the anode holders 40 and 42, respectively, in a manner sealing the anode current collectors therebetween together with the nature of the material of holders 40, 42 provides a lithium-iodine cell construction which confines migration or flow of the iodine material in a manner preventing internal electrical short circuits in the cell. The lithium-iodine cell according to the present invention delivers an output of about 2.8 volts and has a current capability of about 1.0 ampere hour under load conditions.

It is therefore apparent that the present invention accomplishes its intended objects. While a single embodiment of the present invention has been described in detail, this is done for the purpose of illustration, not limitation.

We claim:

1. A lithium-iodine cell comprising:
   a. a first container element having a solid body portion defining an interior region therein, an opening communicating with said region, a continuous peripheral flange around said opening extending outwardly from said body portion, and a continuous internal flange extending inwardly from said body portion into the interior thereof, said container being of a material which is heat sealable and does not exhibit electronic conduction when exposed to iodine;
   b. a second container element having a solid body portion defining an interior region therein, an opening communicating with said region, a continuous peripheral flange around said opening extending outwardly from said body portion, and a continuous internal flange extending inwardly from said body portion into the interior thereof, said container being of a material which is heat sealable and does not exhibit electronic conduction when exposed to iodine;

c. said first and second containers being juxtaposed to define an assembly with the peripheral flanges of said containers being in contact and the interior regions of said containers defining a single closed chamber in the assembly;

d. lithium anode means held in said chamber by said container elements, said anode means comprising first and second lithium elements in said first and second container elements, respectively, and extending along the interior region thereof;

e. electrical conductor means operatively connected to said lithium anode means and extending from said assembly;

f. cathode means comprising iodine-containing material in said chamber and operatively contacting said lithium anode means;

g. electrical conductor means operatively connected to said cathode means and extending from said assembly;

h. said peripheral flanges of said holders being heat sealed together and the resulting sealed flange extending outwardly from the assembly; and i. said lithium elements contacting corresponding surfaces of said internal flanges of said container elements in a manner sealing against flow of cathode material between said lithium elements and said flanges.

2. A cell according to claim 1, wherein each of said peripheral flanges of said first and second container elements is disposed in a plane generally parallel to the plane of the opening in the corresponding one of said first and second container elements.

3. A cell according to claim 1, wherein each of said first and second container elements is generally cup-shaped having a generally planar base portion and a rim portion extending outwardly from said base portion and disposed at about an acute angle, said peripheral flange extending outwardly from said rim portion.

4. A cell according to claim 1, wherein said resulting sealed flange is shaped to include a portion curved and extending inwardly toward said assembly.

5. A cell according to claim 1, wherein each of said lithium elements is positioned adjacent a surface of the interior region of the corresponding container element, and wherein said anode electrical conductor means comprises first and second anode current collector elements contacting said first and second lithium elements, respectively, said current collector elements being positioned between the corresponding one of said lithium elements and the interior surface of the corresponding container element, and first and second electrical conductor leads each connected at one end to a corresponding one of said first and second current collector elements, respectively, and extending outwardly through the corresponding one of said container elements.

6. A cell according to claim 5, wherein said first and second container elements are of a material which is pressure bondable to lithium and further including an additional lithium element positioned between each of said current collectors and the interior surface of the corresponding container element, said first and second lithium elements and said additional lithium elements being pressure bonded to the corresponding ones of said container elements in a manner embedding said current collector elements.

7. A cell according to claim 1, wherein each of said container elements is of a material which is pressure-bondable to lithium and is generally cup-shaped having a base portion, a rim portion extending from said base portion, said internal flange extending inwardly from said rim portion, said peripheral flange extending outwardly from said rim portion, each of said lithium elements being formed under pressure into the corresponding container element in a manner extending along the interior surfaces of said base and rim portions and abutting said internal flange portion.

8. A cell according to claim 1, wherein iodine-containing cathode material comprises a charge transfer complex of an organic donor component and iodine.

9. A cell according to claim 1, wherein said lithium anode means has a coating thereon and operatively associated with said cathode means, said coating being of an organic electron donor component material.

10. A cell according to claim 1, further including a container for housing said cell and potting material in said container encapsulating said cell, said potting material being non-conductive in the presence of iodine.

11. A cell according to claim 1, wherein said container has a pair of generally planar spaced-apart side wall portions, a planar wall portion joining said side wall portions at one end of said container, and a curved wall portion joining said wall portions along the remainder of the container.

12. A cell according to claim 1, wherein said curved wall portion includes spaced apart curved wall portions adjacent said planar end wall portion and another curved wall portion opposite said planar end wall portion, said spaced apart portions being curved in a plane generally perpendicular to the planes of said side wall portions and said other curved wall portion being of compound curvature in a plane generally perpendicular to said side wall portions and in a plane generally parallel to said side wall portions.

13. A cell according to claim 1, further including:
a. a potting material encapsulating said cell, said potting material being non-conductive in the presence of iodine; and
b. an hermetically sealed casing containing said encapsulated cell.

14. A cell according to claim 13, wherein said casing is of metal and has a pair of generally planar spaced-apart side wall portions, a pair of curved end wall portions joining said side walls at opposite ends thereof, another curved end wall portion joining said side walls between said first-named end wall portions, and a generally planar lid element hermetically sealed to the casing at the end opposite said other curved wall portion.

15. A cell according to claim 1, wherein said anode means comprises first and second lithium elements in said first and second container elements, respectively, and extending along the interior region thereof and wherein each of said containers has an internal flange extending inwardly from said body portion into the interior thereof, said lithium elements contacting corresponding surfaces of said internal flanges in a manner sealing against flow of cathode material between said lithium elements and said flanges.

16. A method of making a lithium-iodine cell comprising the steps of:
a. providing a first cell subassembly comprising a container element having a peripheral flange of heat sealable material, said container having a body portion housing lithium anode means and iodine-containing cathode material;

b. providing a second cell subassembly comprising a container element having a peripheral flange of heat sealable material, said container element having a body portion housing lithium anode means and iodine-containing cathode material;

c. placing said first and second cell subassemblies in juxtaposition in a manner such that the cathode materials thereof are in operative contact with each other and with cathode current collector means and such that said peripheral flanges are in substantial contact;

d. applying heat and force to said peripheral flanges in a manner heat sealing said flanges together; and e. cooling said body portions of said container elements to a temperature sufficiently low to prevent melting and flowing of said cathode material during said step of applying heat and pressure to said flanges.

17. A method according to claim 16, further including shaping the heat sealed peripheral flange to include a portion extending outwardly from the assembly and a curved portion extending toward said assembly.

18. A lithium-iodine cell comprising:

a. first and second container elements, each of said container elements being generally cup-shaped having a generally planar base portion, a continuous rim portion extending outwardly from said base portion and disposed at about an acute exterior angle relative to the plane of said base portion, and a continuous peripheral flange extending outwardly from said rim portion, each of said containers being of a material which is heat sealable and does not exhibit electronic conduction when exposed to iodine;

b. said first and second containers being juxtaposed to define an assembly with the flanges of said containers being heat sealed together and the interior regions of said containers defining a single closed chamber in the assembly;

c. lithium anode means held in said chamber by said container elements;

d. electrical conductor means operatively connected to said lithium anode means and extending from said assembly;

e. cathode means comprising iodine-containing material in said chamber and operatively contacting said lithium anode means;

f. electrical conductor means operatively connected to said cathode means and extending from said assembly; and g. a housing enclosing said assembly, said housing having a pair of generally planar spaced-apart sidewall portions, a planar end wall portion joining said sidewall portions at one end of said container, said sidewall portions terminating in opposed outwardly curved edges at the opposite end of said container, and an outwardly curved wall portion joining said sidewall portions along the remainder of said container between said two ends and including said end having said curved edges.

* * * * *

UNITED STATES PATENT AND TRADEMARK OFFICE
CERTIFICATE OF CORRECTION

PATENT NO. : 3,996,066
DATED : December 7, 1976
INVENTOR(S) : Ralph T. Mead, et al It is certified that error appears in the above-identified patent and that said Letters Patent are hereby corrected as shown below:

On the title page "18 Claims" should read --17 Claims--.

Delete Claim 15.

Claim "16" should be renumbered as Claim --15--;

Claim "17" should be renumbered as Claim --16--;

Claim "18" should be renumbered as Claim --17--.

Signed and Sealed this

Twenty-fifth Day of October 1977

[SEAL]

Attest:

RUTH C. MASON
Attesting Officer

LUTRELLE F. PARKER
Acting Commissioner of Patents and Trademarks